Patented Feb. 6, 1934

1,945,884

UNITED STATES PATENT OFFICE 1,945,884

MANUFACTURE OF METAL COATED SHEETS

Willard O. Cook, Oscar O. Miller, and Joshua C. Whetzel, Pittsburgh, Pa., assignors to American Sheet and Tin Plate Company, a corporation of New Jersey No Drawing. Application December 12, 1930
Serial No. 502,000

11 Claims. (Cl. 91—70.2)

This invention relates to the manufacture of metallic coated ferrous metal articles and more particularly to the manufacture of zinc, tin and terne coated ferrous metal plates, and has for its object the provision of a novel method of manufacture whereby the film which may be composed of the coating metal oxid or other compounds and forms on the hot plates as they pass into the atmosphere after coating is reduced to a minimum.

The presence of a film of this kind may be illustrated in a number of ways but the method using iodine crystals will be described here. If a surface of tin is exposed with no protective coating on it such as tin oxid and a crystal of iodine is dropped on this surface interference rings of tin iodide will form. If a film on such a surface is caused to grow the interference rings produced when a crystal of iodine is dropped on this surface become less intense as the film increases in thickness and finally when the film is thick enough, but not necessarily visible, no rings of tin iodide are formed. The film of tin oxid may be caused to grow to this thickness if held in the air at room temperature for a long time or heated to a temperature just below the melting point of the metal for a very short time. This is not limited to tin but applies to other metals also.

The art of lithographing, lacquering and enameling tin plate and other metal coated plates is constantly increasing in magnitude and since this art necessitates the baking of the sheets or plates to dry and set the materials used in lithographing, lacquering and enameling it has been found that coated plates as produced by ordinary standard methods were impractical for this use due to the film of oxid or the like which was formed on the plate during or immediately after the coating operation, the film increasing during the baking operation necessary to finish the lithographing, lacquering or enameling.

It has been found that some standard coated plates not only become unsatisfactory due to discoloration by the film of oxid partly formed in the baking operation, but also because this film prevents soldering which is necessary in making up the sheets into finished articles such as cans or other receptacles.

The present method consists in reducing the temperature of the coated sheets as they pass from the coating operation into the air to such a temperature that the film formed thereon will be reduced to a minimum.

We have found that if the coated plates are discharged into the air at a temperature of from approximately the freezing point to within 15° F. above the freezing point of the coating metal or from 450° to 465° F. for tin plate the film formed will be reduced to such an extent that the increase or growth caused by the baking of the sheets after lithographing, lacquering or enameling is not sufficient to discolor the material or interfere with the soldering or other processing of the sheets or plates.

The film formed on the coated sheets or plates is not necessarily always composed of oxid although this is the film most often met in practice. Gases other than oxygen and carbon dioxid will produce a film such as hydrogen sulphid, the halogens, the halogen acids, and vapors from various inorganic and organic compounds. The composition and physical properties of the films depend on the gases or vapors producing them, but in general they give interference colors when sufficiently thick and hinder soldering and other processing where a clean surface is necessary.

The sheet temperature as it emerges from the oil into the air is the controlling factor in preventing excessive film on the sheets. This sheet temperature is determined in part by the temperature of the coating metal, by the speed or rate of travel of the sheet through the metal, and in tin and terne plates by the temperature of the oil, the rate of travel of the sheet through the oil and the depth of the oil column.

In coating methods in which the sheets pass from the molten metal through a body or column of oil, the sheets are generally at a slightly higher temperature than the average temperature of the oil due to a metal temperature higher than that of the oil. This difference in temperature, however small, will increase as the metal temperature becomes higher. The difference between the sheet temperature and the oil will be less the longer the sheet is in the oil. This interval of time may be varied by changing the speed of the plate through the oil or the height of the oil column through which the sheet passes. These conditions are brought about by the fact that the coating metal and iron are good conductors of heat and when the sheet leaves the molten metal it has acquired the temperature of the molten metal. The oil is not a good conductor of heat and the flow of heat from the sheet to the oil is not so rapid as the flow of heat from the molten metal bath to the sheet. Consequently, the sheet does not reach the temperature of the oil although the difference is of small magnitude.

By controlling the temperature of the sheets as they pass from the coating bath into the air to approximately 15° F. above the freezing point of the coating metal, sheets are uniformly produced having no discoloring film visible in ordinary white light to the naked eye and the amount of invisible film reduced to such a minimum that they may be given several eight to ten-minute treatments in an oven at from 10° F. to 75° F. below the melting point of the coating metal without causing a growth of the film sufficiently to be objectionable from the standpoint of appearance or soldering.

When tin is the coating metal the treatment temperatures are preferably limited to from 375° F. to 425° F.

On the other hand sheets produced by the ordinary method which exit into the atmosphere generally at temperatures of 470° F. or above, have an oxid film of such magnitude that one or two eight to ten-minute periods at 375° to 425° F. usually cause the sheet to appear discolored to the eye and give trouble in soldering operations.

While we have described certain specific methods of controlling the temperature of the sheets and thereby the thickness of the objectionable film on metal coated sheets, we do not wish to be limited thereto, since any combination or all of such steps or methods may be used.

We claim:

1. In the hot coating of metal sheets with other metals, the step of discharging the coated sheets into the atmosphere with the coating metal on the sheets at such a temperature above the freezing point of said coating metal that the sheets so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

2. In the hot coating of metal sheets with tin the step of discharging the coated sheets into the atmosphere with the coating metal on the sheets at a temperature substantially 15° F. above the freezing point of said coating metal that the sheets so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

3. In the hot coating of metal sheets with other metals, the steps of cooling the coating on the sheets to a predetermined temperature above the freezing point of the coating metal, and discharging the coated sheets into the atmosphere with the coating thereon at such a predetermined temperature that the sheets so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

4. In the hot coating of metal sheets with tin, the steps of cooling the coating tin on the sheets to a temperature substantially 15° F. above the freezing point of the coating tin, and discharging the coated sheets into the atmosphere with the tin coating on the sheets at such a predetermined temperature that the sheets so produced will have no discoloring film visible in ordinary white light to the naked eye and the amount of invisible film is reduced to such a minimum that they may be given several eight to ten minute treatments in an oven at from 10° to F. to 75° F. below the melting point of the coating metal without causing a growth of the film sufficiently to be objectionable from the standpoint of appearance or soldering.

5. The herein described method of coating metal objects, which comprises passing the metal objects into, through and out of a molten bath of the coating metal to obtain a coating of said molten metal on the objects, and discharging the coated objects into the atmosphere with the coating metal on the objects at such a temperature above the freezing point of the coating metal that the coated objects so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

6. The herein described method of coating metal objects, which comprises passing the metal objects into, through and out of a molten bath of the coating metal, to obtain a coating of said molten metal on the objects, thereafter passing the coated objects into, through and out of a cooling medium and into the atmosphere, maintaining the cooling medium at a predetermined temperature, and regulating the travel of the objects through the cooling medium and into the atmosphere so that the molten metal coating on the objects will be at such a temperature above the freezing point of the molten metal that the coated objects so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectionable from the standpoint of appearance or soldering.

7. The herein described method of coating metal objects with tin, which comprises passing the metal objects into, through and out of a molten bath of tin to obtain a molten tin coating on the objects, and discharging the coated objects into the atmosphere with the molten tin coating on the objects at substantially 15° F. above the freezing point of the molten tin, that the coated objects so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

8. The herein described method of coating metal objects with tin, which comprises passing the metal objects into, through and out of a molten bath of tin to obtain a molten tin coating on the objects, thereafter passing the coated objects into, through and out of a cooling medium and into the atmosphere, maintaining the cooling medium at a predetermined temperature, and regulating the travel of the tin coated objects through the cooling medium and into the atmosphere that the molten tin coating on the objects will be at substantially 15° F. above the freezing point of the molten tin, that the coated objects so produced will have no discoloring film visible in ordinary white light to the naked eye and the amount of invisible film is reduced to such a minimum that they may be given several eight to ten minute treatments in an oven at from 10° F. to 75° F. below the melting point of the coating metal without causing a growth of the film sufficiently to be objectional from the standpoint of appearance or soldering.

9. In the hot coating of metal sheets with tin, the steps of maintaining the body of oil, through which said sheets pass after passing through the molten tin, at between approximately 450° F. and 465° F., and passing the coated sheets into, through and out of the body of oil and into the atmosphere at such a rate of travel that the molten tin coating on the sheets will be cooled to approximately the same temperature as the oil when the sheets are discharged into the atmosphere.

10. As an article of manufacture, the product of the method of claim 1, being a metal sheet provided with a hot dipped coating of metal having a film of the coating compound such as an oxide of said coating of such thickness as not to be visible to the naked eye in white light and which may be maintained at a temperature of approximately 10° F. to 75° F. below the melting point of the coating metal for a material length of time without causing a growth of the film sufficiently to be objectionable from the standpoint of appearance or soldering.

11. As an article of manufacture, the product of method claim 4, being a metal sheet provided with a hot dipped coating of tin having a film of tin compound such as tin oxide of such thickness as not to be visible to the naked eye in white light and which may be maintained at a temperature of approximately 10° F. to 75° F. below the melting point of the tin coating without causing a growth of the film sufficiently to be objectionable from the standpoint of appearance or soldering.

WILLARD O. COOK.
OSCAR O. MILLER.
JOSHUA C. WHETZEL.